United States Patent
Yamazaki et al.

(10) Patent No.: US 9,421,965 B2
(45) Date of Patent: *Aug. 23, 2016

(54) METHOD AND APPARATUS FOR LIMITING ENGINE TORQUE TO PROTECT DISCONNECT CLUTCH IN A HYBRID VEHICLE

(71) Applicant: FORD GLOBAL TECHNOLOGIES, LLC, Dearborn, MI (US)

(72) Inventors: Mark Steven Yamazaki, Canton, MI (US); Bernard D. Nefcy, Novi, MI (US); Daniel Scott Colvin, Farmington Hills, MI (US); Francis Thomas Connolly, Ann Abor, MI (US); Walter Joseph Ortmann, Saline, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 34 days.

This patent is subject to a terminal disclaimer.

(21) Appl. No.: 14/570,386

(22) Filed: Dec. 15, 2014

(65) Prior Publication Data

US 2015/0099607 A1    Apr. 9, 2015

Related U.S. Application Data

(63) Continuation-in-part of application No. 13/688,333, filed on Nov. 29, 2012, now Pat. No. 8,911,324.

(51) Int. Cl.
*B60W 10/06* (2006.01)
*B60W 10/08* (2006.01)
(Continued)

(52) U.S. Cl.
CPC ............. *B60W 10/08* (2013.01); *B60K 6/38* (2013.01); *B60K 6/387* (2013.01); *B60W 10/02* (2013.01); *B60W 10/06* (2013.01); *B60W 20/10* (2013.01); *B60W 30/186* (2013.01); *B60K 6/46* (2013.01); *B60K 2006/4825* (2013.01);
(Continued)

(58) Field of Classification Search
CPC ........... B60W 10/026; B60W 10/023; B60W 10/08; B60W 10/02; B60W 10/06; B60W 30/186; B60W 2510/0233; B60W 2510/0241; B60W 2710/0208; B60W 2710/083; B60W 2710/0666; B60K 6/46; Y02T 10/6286; Y02T 10/6252; Y10T 477/79; Y10T 477/26; Y10S 903/93
USPC .......................................... 180/65.28, 65.285
See application file for complete search history.

(56) References Cited

U.S. PATENT DOCUMENTS 5,479,898 A    1/1996    Cullen et al.
6,083,139 A    7/2000    Deguchi et al.
(Continued)

FOREIGN PATENT DOCUMENTS

| CN | 1962331 A | 5/2007 |
|---|---|---|
| CN | 1982135 A | 6/2007 |
| KR | 100774691 B1 | 11/2007 |

*Primary Examiner* — Roger Pang
(74) *Attorney, Agent, or Firm* — David B. Kelley; Brooks Kushman P.C.

(57) ABSTRACT

A powertrain comprising an engine, a motor, a disconnect clutch connected between the engine and the motor, and a transmission. The transmission is connected to the motor by a torque converter and lock-up clutch and selectively and indirectly connected to the engine by the disconnect clutch. A controller receives an engine torque output signal and reduces the torque output of the engine to the clutch capacity limit value. A system and a method are also provided for controlling a powertrain for a hybrid vehicle.

13 Claims, 3 Drawing Sheets

(51) Int. Cl.
  *B60W 30/186* (2012.01)
  *B60K 6/38* (2007.10)
  *B60K 6/387* (2007.10)
  *B60W 20/00* (2016.01)
  *B60W 10/02* (2006.01)
  *B60K 6/46* (2007.10)
  *B60K 6/48* (2007.10)

(52) U.S. Cl.
  CPC ......... *B60W 10/023* (2013.01); *B60W 10/026* (2013.01); *B60W 2510/0208* (2013.01); *B60W 2510/0216* (2013.01); *B60W 2510/0233* (2013.01); *B60W 2510/0241* (2013.01); *B60W 2510/0695* (2013.01); *B60W 2710/027* (2013.01); *B60W 2710/0666* (2013.01); *B60W 2710/083* (2013.01); *Y02T 10/6252* (2013.01); *Y02T 10/6286* (2013.01); *Y10S 903/93* (2013.01); *Y10T 477/26* (2015.01); *Y10T 477/79* (2015.01)

(56) References Cited

U.S. PATENT DOCUMENTS

| | | | |
|---|---|---|---|
| 7,370,715 B2 | 5/2008 | Colvin et al. | |
| 7,472,769 B2 | 1/2009 | Yamanaka et al. | |
| 7,885,737 B2 | 2/2011 | Hirata et al. | |
| 8,491,441 B2 | 7/2013 | Fukitani | |
| 8,529,399 B2 | 9/2013 | Schenk et al. | |
| 8,562,484 B1 * | 10/2013 | Nedorezov | B60W 10/02 477/32 |
| 8,911,324 B2 * | 12/2014 | Yamazaki | B60W 10/06 180/65.28 |
| 2009/0166109 A1 | 7/2009 | Duan et al. | |
| 2011/0061954 A1 | 3/2011 | Singh et al. | |
| 2011/0118078 A1 | 5/2011 | Kraska et al. | |
| 2011/0118915 A1 | 5/2011 | Ortmann et al. | |
| 2012/0316033 A1 | 12/2012 | Jung et al. | |
| 2013/0012353 A1 | 1/2013 | Yoshida et al. | |
| 2013/0296110 A1 | 11/2013 | Shelton et al. | |
| 2013/0296113 A1 | 11/2013 | Nefcy et al. | |
| 2013/0296117 A1 | 11/2013 | Shelton et al. | |
| 2013/0297111 A1 | 11/2013 | Yamazaki et al. | |

* cited by examiner

METHOD AND APPARATUS FOR LIMITING ENGINE TORQUE TO PROTECT DISCONNECT CLUTCH IN A HYBRID VEHICLE

CROSS-REFERENCE TO RELATED APPLICATION

This application is a continuation-in-part of U.S. application Ser. No. 13/688,333, now U.S. Pat. No. 8,911,324, filed Nov. 29, 2012, the disclosure of which is hereby incorporated in its entirety by reference herein.

TECHNICAL FIELD

This disclosure relates to hybrid vehicle powertrains that have an engine and an electric machine, or motor/generator, that provide torque in combination or separately to drive the vehicle.

BACKGROUND

Transmissions for vehicles having a combustion engine are protected by an interface that limits the input torque to the transmission. In some hybrid vehicles a combustion engine and an electric machine, or motor/generator, are both available for torque production and are separable by a disconnect clutch. The sum of the torque provided by the combustion engine and an electric machine is transmitted to the input of the transmission through a launch clutch. The launch clutch must be rated to hold the torque from the engine and the electric machine, including inertia torques.

Transmission interfaces are available that limit the torque to the input of the transmission to protect a launch clutch that connects the torque producer, for example a combustion engine, to the transmission. These transmission interfaces do not limit the engine torque separately from the electric machine torque in a hybrid vehicle powertrain that has more than one source of torque. As a result, the disconnect clutch is unprotected by use of current transmission interfaces. To compensate for the lack of protection, the system controller may be required to reduce the total input torque below driver demand to protect the disconnect clutch from excessive torque loads.

This disclosure focuses on the above problem and other problems relating to the protection of the disconnect clutch from excessive torque.

SUMMARY

The above problems are addressed by creating a separate sub-system that includes the disconnect clutch that may be integrated into the hybrid transmission. Interfaces are created that convey the limitations of the disconnect clutch to the vehicle system controller. The vehicle system control limits engine torque and/or electric machine torque during vehicle operation. In the event the engine torque is limited, the driver demanded torque may be satisfied by added electric machine torque.

According to one aspect of this disclosure, a powertrain comprising an engine, a motor, a disconnect clutch connected between the engine and the motor, and a transmission. The transmission is connected to the motor by a torque converter and lock-up clutch and selectively and indirectly connected to the engine by the disconnect clutch. A controller receives an engine torque output signal and reduces the torque output of the engine to the clutch capacity limit value.

According to another aspect of this disclosure, a method is disclosed for controlling a powertrain including an engine and a motor that are separated by a disconnect clutch and that provide torque to a transmission. The method, in part, comprises reducing torque produced by the engine to a disconnect clutch capacity limit.

According to further aspects of this disclosure, a system is provided for controlling a powertrain for a hybrid vehicle. The powertrain includes an engine, a motor connected to the engine and a transmission connected to the motor. A disconnect clutch is operatively connected between the engine and the motor and is operable to separate the engine from the motor. The engine and the motor are selectively connectable to the transmission. A controller reduces torque produced by the engine to a disconnect clutch capacity limit.

The previously described powertrain, method of controlling a powertrain, and system for controlling the powertrain may also include additional features wherein the controller may command the motor to increase torque output from the motor to meet driver demand for torque and make-up for the reduction of torque output of the engine. The controller may reduce the motor torque when the torque converter and lock-up clutch is open or slipping to a negative disconnect clutch capacity limit value. The engine output torque signal corresponds to the sum of torque produced by the engine and engine inertia torque. The motor torque signal is the sum of torque produced by the motor and motor inertia torque. The engine output torque signal may be the sum of torque produced by the engine and engine inertia torque. The controller compares the engine output torque signal to a disconnect clutch capacity limit value.

The above aspects of this disclosure and other aspects will be described in greater detail in the detailed description with reference to the attached drawings.

DETAILED DESCRIPTION

A detailed description of the illustrated embodiments of the present invention is provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Figure 1:
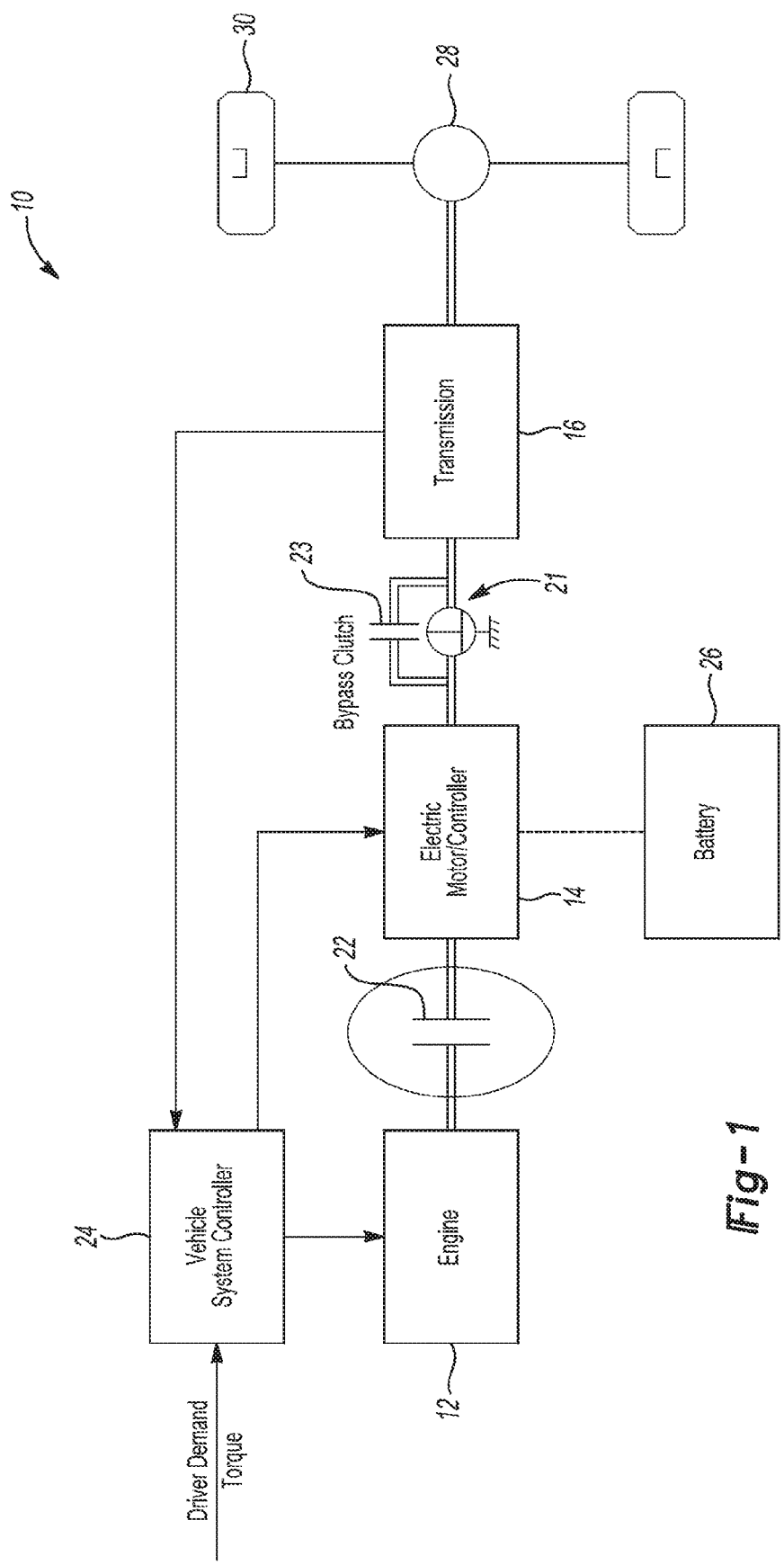
FIG. 1 is a diagrammatic representation of a hybrid vehicle powertrain.

Referring to FIG. 1, a powertrain 10 for a hybrid electric vehicle is diagrammatically illustrated. An engine 12 and motor 14 separately, or in combination, provide torque input to the powertrain 10. A transmission 16 receives torque from the engine 12 and the motor 14.

A disconnect clutch 20 is provided between the engine 12 and the motor 14. The disconnect clutch 20 allows torque to be provided by the engine 12, the motor 14, or both the engine 12 and the motor 14. The disconnect clutch 20 also allows the engine 12 to be connected to the motor 14 for charging.

A torque converter 21 and lock-up clutch 23 is provided between the motor 14 and the transmission 16. The torque converter 21 and lock-up clutch 23 is engaged whenever torque is required by the transmission 16 and is disengaged when the vehicle is in park or neutral.

A vehicle system controller 24 receives signals corresponding to the driver demand torque and control the engine 12 and motor 14 to create torque in response to the driver demand torque.

A battery 26 is electrically connected to the motor 14. The battery 26 provides energy to drive the motor 14. The motor 14 provides energy to the battery for storage when the engine 12 is operating and the disconnect clutch 20 connects the engine 12 to the motor 14 to operate the motor 14 as a generator. The battery may also provide DC/DC power to a low voltage battery that, in turn, provides power to a low voltage starter (not shown). An auxiliary pump may also be powered by the DC/DC power supply (not shown).

Torque from the transmission 16 is provided to a differential 28 to drive the wheels 30.

Figure 2:
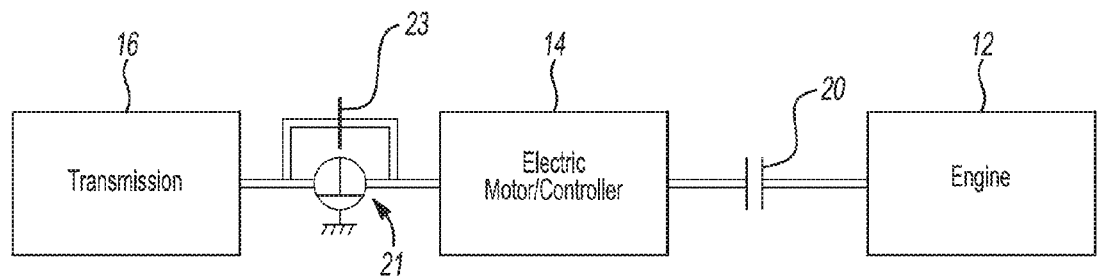
FIG. 2 is a simplified diagrammatic view of the powertrain shown in FIG. 1 with an engaged torque converter and lock-up clutch.

Referring to FIG. 2, a simplified powertrain diagram is shown in which an engine 12 may be connected to the motor 14 by a disconnect clutch 20. The disconnect clutch 20 is open as illustrated in FIG. 2. Torque is provided to the transmission through the torque converter 21 and lock-up clutch 23 that is shown to be closed in FIG. 2.

Figure 3:
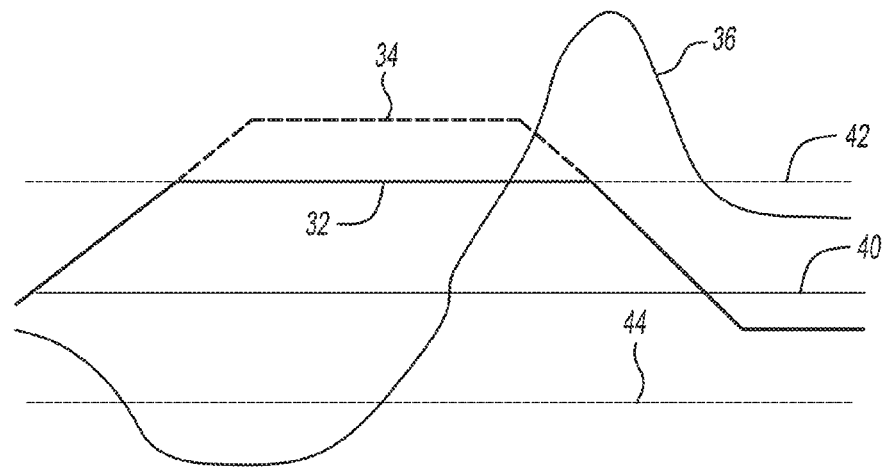
FIG. 3 is a torque diagram showing the controller limiting the engine torque to a disconnect clutch capacity.

Referring to FIG. 3, a graphic representation is provided of the vehicle system controller 24 limiting the engine torque supplied to a disconnect clutch positive limit. Engine torque as limited is illustrated by line 32. The requested engine torque is illustrated by line 34. Motor torque is illustrated by line 36. A zero torque line is represented by line 40.

Line 32 initially increases until the disconnect clutch positive limit line 42 is reached. However, because the requested engine torque exceeds the disconnect clutch limit line 42 as indicated by dashed line 34, torque from the engine 12 is limited. Motor torque line 36 is initially reduced below the zero torque line 40 indicating that the battery is charging at a greater rate as the engine torque increases. Motor torque 36 increases to make up for the shortfall in torque relative to the driver demanded torque until the engine torque line 32 exceeds the disconnect clutch positive limit line 42. Engine torque is reduced after motor torque reaches the level at which demand is satisfied.

The torque produced by the engine 12 including inertia torque is carried by the disconnect clutch 20. The motor 14 may produce torque including inertia torque that is required to satisfy the driver demand and is not restricted by the disconnect clutch capacity. The vehicle system controller 24 reduces the engine torque including inertia torque to protect the disconnect clutch 20. Engine torque including inertia torque is limited by the disconnect clutch capacity. Disconnect clutch capacity may be different for a specific gear or during certain gear changes.

Figure 4:
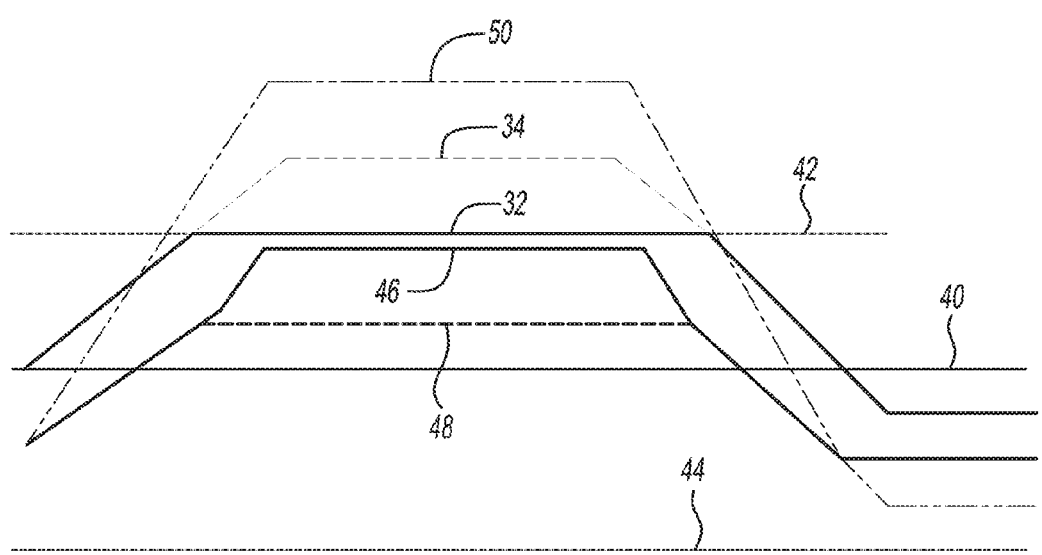
FIG. 4 is a torque diagram showing the controller limiting the engine torque to the disconnect clutch capacity and commanding the motor to produce additional torque including inertial torque required to satisfy driver demand.

Referring to FIG. 4, operation of a powertrain 10 is shown with the motor 14 adding torque to make up for the limiting of the engine torque, as previously described with reference to FIG. 3. A boosted motor torque line 46 illustrates the torque provided by the motor 14 to make up for protecting the disconnect clutch 20 by reducing the torque provided by the engine 12 to the disconnect clutch positive limit level 42. A non-boosted motor torque line 48 represents the level of torque that would normally be provided by the motor 14 if the engine torque was not limited to protect the disconnect clutch 20. The sum of the engine torque as limited line 32 and boosted motor torque line 46 is combined to provide the demanded and delivered torque line 50.

Figure 5:
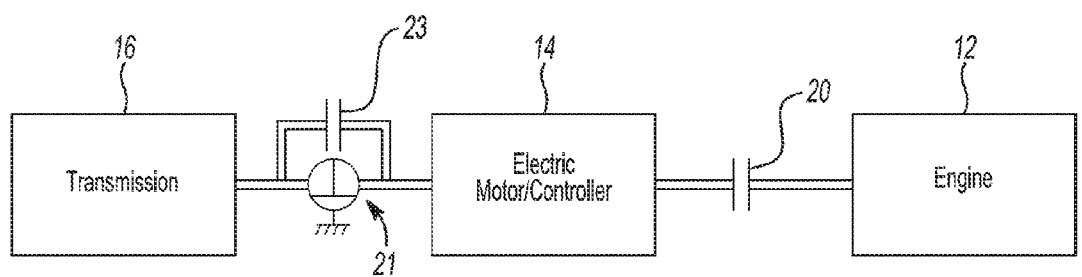
FIG. 5 is a simplified diagram of the powertrain shown in FIG. 1 with the torque converter and lock-up clutch open or slipping, the engine torque being limited to the disconnect clutch capacity and the electric machine torque being limited by the disconnect clutch negative limit.

Referring to FIG. 5, a simplified diagram of the powertrain is shown to include the engine 12 connected by the disconnect clutch 20 to the motor 14. The torque converter 21 and lock-up clutch 23 operatively connected between the motor 14 and transmission 16 is open in FIG. 5 to represent an open or slipping torque converter and lock-up clutch condition. When the motor is charging the battery 25 (shown in FIG. 1) in neutral, park or creep operational modes the torque converter and lock-up clutch may be open or slipping. In this situation, the vehicle system controller 24 must limit both the engine torque and the motor torque including the respective inertia torques to protect the disconnect clutch 20.

Figure 6:
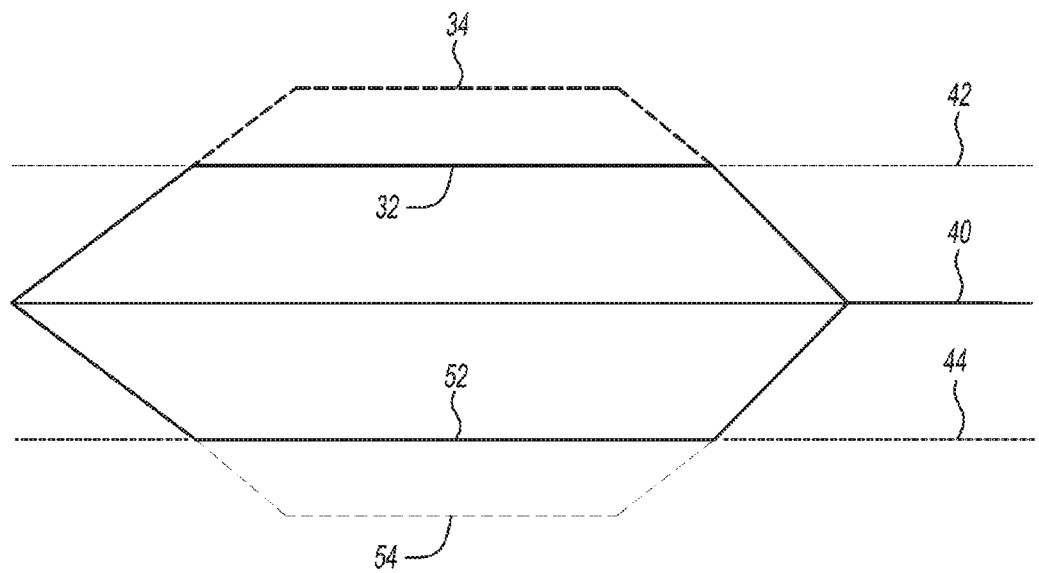
FIG. 6 is a torque diagram of the powertrain shown in FIG. 1 showing the positive torque limit and negative torque limit.

Referring to FIG. 6, the engine torque is limited as described with reference to FIG. 3 to protect the disconnect clutch 20 from exceeding its positive limit 42. Line 52 illustrates that the electric machine torque as limited. The electric machine torque is limited when charging cannot exceed the disconnect clutch negative limit 44. As a result, motor torque as limited 52 is less negative than the requested motor torque 54. The disconnect clutch 20 is protected from exceeding its positive limit line 42 by limiting both the engine torque and the electric machine torque. The disconnect clutch 20 is protected from exceeding its negative limit represented by line 44.

The clutch capacity equation is a function of the pressure applied to the clutch. The clutch capacity equation is the absolute value of (engine torque−engine inertia torque)= absolute value of (motor torque−motor inertia torque−torque converter and lock-up clutch torque).

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:
1. A powertrain comprising:
    an engine;
    a motor;
    a disconnect clutch connected between the engine and the motor;
    a transmission connected to the motor and selectively connected to the engine;
    a torque converter and lock-up clutch connected between the motor and the transmission; and
    a controller configured to limit engine torque to a disconnect clutch capacity limit, and limit motor torque to a negative disconnect clutch capacity limit when the lock-up clutch is open or slipping.

2. The powertrain of claim 1 wherein the controller is further configured to command the motor to increase torque output from the motor to meet driver demand for torque and make-up for the limiting of engine torque.

3. The powertrain of claim 1 wherein the controller is further configured to receive an engine torque output signal.

4. The powertrain of claim 3 wherein the engine torque output signal is the sum of torque produced by the engine and engine inertia torque.

5. The powertrain of claim 3 wherein the engine torque output signal is the sum of torque produced by the engine and engine inertia torque, and wherein the controller is further configured to compare the engine torque output signal to the disconnect clutch capacity limit value.

6. A method of controlling a powertrain including an engine and a motor that may be separated by a disconnect clutch and that provide torque to a transmission, the method comprising:
limiting engine torque output to a disconnect clutch capacity limit value; and
if a torque converter bypass clutch between the motor and the transmission is open or slipping, limiting the motor torque to a negative disconnect clutch capacity limit value.

7. The method of claim 6 further comprising:
increasing the torque output of the motor by the amount the engine torque is limited.

8. The method of claim 6 wherein torque produced by the engine includes engine inertia torque and torque produced by the motor includes motor inertia torque.

9. The method of claim 6 wherein torque produced by the engine includes engine inertia torque.

10. A system for controlling a powertrain comprising:
an engine;
a motor connected to the engine;
a transmission connected to the motor;
a disconnect clutch that is operatively connected between the engine and the motor and is operable to separate the engine from the motor, wherein the engine and the motor are selectively connectable to the transmission with a torque converter and lock-up clutch; and
at least one controller configured to limit torque produced by the engine to a disconnect clutch capacity limit, and limit the torque produced by the motor when the lock-up clutch is open or slipping to a negative disconnect clutch capacity limit value.

11. The system of claim 10 wherein the controller commands the motor to increase torque output from the motor to meet driver demand for torque and make-up for the reduction of torque output of the engine.

12. The system of claim 10 wherein the controller is further configured to receive an engine output torque signal that is the sum of torque produced by the engine and engine inertia torque, and receive a motor torque signal that is the sum of torque produced by the motor and motor inertia torque.

13. The system of claim 10 wherein the controller is further configured to receive an engine output torque signal that is the sum of torque produced by the engine and engine inertia torque.

* * * * *